United States Patent
Ichikawa et al.

(10) Patent No.: US 6,872,286 B2
(45) Date of Patent: Mar. 29, 2005

(54) WATER ELECTROLYSIS CELL

(75) Inventors: Masao Ichikawa, Wako (JP); Kenta Urata, Wako (JP); Katsutoshi Nosaki, Wako (JP); Masanori Okabe, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 246 days.

(21) Appl. No.: 10/247,334

(22) Filed: Sep. 20, 2002

(65) Prior Publication Data

US 2003/0057088 A1 Mar. 27, 2003

(30) Foreign Application Priority Data

Sep. 21, 2001 (JP) .................................... 2001-288931
May 23, 2002 (JP) .................................... 2002-148542

(51) Int. Cl.[7] .................... C25B 11/08; C22C 5/04; B01J 23/46
(52) U.S. Cl. .................... 204/252; 204/293; 204/296; 148/430; 502/326
(58) Field of Search .................... 204/293, 252, 204/296; 502/326; 205/628, 630; 148/442, 430; 420/461, 462, 580

(56) References Cited

U.S. PATENT DOCUMENTS

| | | | | |
|---|---|---|---|---|
| 4,297,245 A | * | 10/1981 | Bartley et al. ............... | 502/262 |
| 4,326,943 A | * | 4/1982 | Banziger et al. ........ | 204/290.06 |
| 4,457,822 A | * | 7/1984 | Asano et al. ................ | 204/252 |
| 4,992,126 A | * | 2/1991 | Door .......................... | 156/182 |
| 5,409,877 A | * | 4/1995 | Takeuchi et al. ............ | 502/245 |
| 6,156,694 A | * | 12/2000 | Harper ........................ | 502/301 |
| 6,372,119 B1 | * | 4/2002 | Ray et al. .................... | 205/387 |

FOREIGN PATENT DOCUMENTS

| JP | 59-026140 A | * | 2/1984 | ............ B01J/23/40 |
|---|---|---|---|---|
| JP | 10-052641 A | * | 2/1998 | ............ B01J/23/89 |
| JP | 10-273791 | | 10/1998 | |

* cited by examiner

Primary Examiner—Roy King
Assistant Examiner—Harry D. Wilkins, III
(74) Attorney, Agent, or Firm—Arent Fox, PLLC

(57) ABSTRACT

A water electrolyte cell can be used with a high energy efficiency over a long period of time. The water electrolyte cell has a pair of catalytic layers and an electrolyte membrane sandwiched between the catalytic layers. The catalytic layers includes an anode catalytic layer which contains a catalyst comprising an alloy of ruthenium, iridium, and at least one metal selected from the group consisting of iron, nickel, and cobalt, or an oxide of the alloy, or a mixture of the alloy and an oxide thereof. The at least one metal has a molar ratio with respect to ruthenium and iridium in the range from 0.05 to 0.13 mol with respect to 0.8 to 2.2 mols, preferably 1.8 to 2.2 mols, of ruthenium and 0.8 to 1.2 mols of iridium. The electrolyte membrane comprises a solid polymer electrolyte membrane.

12 Claims, 5 Drawing Sheets

8 6 4 2 3 5 7

WATER ELECTROLYSIS CELL

BACKGROUND OF THE INVENTION

1. Field of the Invention

The present invention relates to a water electrolysis cell for producing hydrogen and oxygen by electrolyzing water.

2. Description of the Related Art

Heretofore, there has been known, as shown in FIG. 1 of the accompanying drawings, a water electrolysis cell 1 for producing hydrogen and oxygen by electrolyzing water, which comprises a solid polymer electrolyte membrane 2 sandwiched between a pair of catalytic layers 3, 4 and a pair of porous current distributors 5, 6 mounted respectively on the catalytic layers 3, 4.

Each of the catalytic layers 3, 4 is produced by preparing an electrolytic solution of an electrolyte made of the same components as the solid polymer electrolyte membrane 2, dispersing a given amount of catalyst powder in the electrolytic solution to produce a paste, and applying the paste to a sheet of polytetrafluoroethylene according to a screen printing process. The solid polymer electrolyte membrane 2 is sandwiched between the catalytic layers 3, 4 on those sheets of polytetrafluoroethylene. The assembly is hot-pressed, transferring the catalytic layers 3, 4 to the solid polymer electrolyte membrane 2. In this manner, the catalytic layers 3, 4 are joined to the solid polymer electrolyte membrane 2. The catalytic layers 3, 4 function as anode and cathode catalysts, respectively.

The water electrolysis cell 1 operates as follows: The catalytic layers 3, 4 and the porous current distributors 5, 6 are supplied with water. When a voltage is then applied to the water electrolysis cell 1, water is electrolyzed at the anode according to the formula (1) shown below, generating oxygen and hydrogen ions, with electrons given to the anode. The hydrogen ions pass through the solid polymer electrolyte membrane 2 to the cathode, and are given electrodes from the cathode. As a result, hydrogen is generated at the cathode according to the formula (2) shown below.

$$2H_2O \rightarrow O_2\uparrow + 4H^+ + 4e^- \quad (1)$$

$$2H^+ + 2e^- \rightarrow H_2\uparrow \quad (2)$$

In the water electrolysis cell 1, therefore, oxygen can be generated from the anode, whereas hydrogen can be generated from the cathode.

One known catalyst for use in the anode of the water electrolysis cell 1 is an iridium-based catalyst made of iridium, a binary alloy thereof, or an oxide thereof. The iridium-based catalyst is generally stable under conditions for water electrolysis and hence is suitable for use as a catalyst for water electrolysis. However, the iridium-based catalyst is problematic in that it fails to provide a sufficiently low oxygen overvoltage, reducing the energy efficiency.

To solve the above problem, it may be proposed to use a ruthenium-based catalyst made of ruthenium, a binary alloy thereof, or an oxide thereof which can provide an oxygen overvoltage lower than the iridium-based catalyst. Since, however, the ruthenium-based catalyst generally tends to be eluted under the water electrolysis conditions, water electrolysis cells which use the ruthenium-based catalyst as the catalyst at the anode have a relatively short service life, and cannot remain operational for a long period of time.

There have been proposed mixed catalysts comprising a mixture of an iridium-based catalyst and a ruthenium-based catalyst. For example, Japanese laid-open patent publication No. 10-273791 discloses a catalyst which comprises a mixture of ruthenium oxide and iridium oxide. It is stated in the publication that a water electrolyte cell which uses the disclosed catalyst has a cell voltage in electrolysis lower than a cell using the iridium-based catalyst.

The disclosed mixed catalyst comprises a simple mixture of an iridium-based catalyst and a ruthenium-based catalyst. Therefore, when the ruthenium-based catalyst has been eluted with time, only the iridium-based catalyst which provides a higher oxygen overvoltage than the ruthenium-based catalyst remains as the catalyst, resulting in a reduction in the energy efficiency in electrolysis.

SUMMARY OF THE INVENTION

It is therefore an object of the present invention to provide a water electrolysis cell which can be used with a high energy efficiency over a long period of time.

To achieve the above object, there is provided a water electrolyte cell comprising a pair of catalytic layers and an electrolyte membrane sandwiched between the catalytic layers, the catalytic layers including an anode catalytic layer which contains a catalyst comprising an alloy of ruthenium (Ru), iridium (Ir), and at least one metal selected from the group consisting of iron (Fe), nickel (Ni), and cobalt (Co).

The alloy may be Ru—Ir—Fe, Ru—Ir—Ni, or Ru—Ir—Co, for example. These alloys provide lower oxygen overvoltages than an Ir-based catalyst, and are not eluded or are difficult to elude under conditions for water electrolysis.

The water electrolysis cell with the above alloy used as the anode catalyst can be used with a high energy efficiency over a long period of time.

The catalyst may alternatively comprise an oxide of the above alloy or a mixture of the above alloy and an oxide thereof.

In the alloy, the oxide of the alloy, or the mixture of the alloy and its oxide as described above, the at least one metal may have a molar ratio with respect to ruthenium and iridium in the range from 0.05 to 0.13 mol with respect to 0.8 to 2.2 mols, preferably 1.8 to 2.2 mols, of ruthenium and 0.8 to 1.2 mols of iridium. With this composition, the catalyst has an excellent durability. If the amount of the at least one metal is less than 0.05 mol with respect to 0.8 to 2.2 mols of ruthenium and 0.8 to 1.2 mols of iridium, then it is not effective enough to prevent ruthenium from being eluded. If the amount of the at least one metal exceeds 0.13 mol with respect to 0.8 to 2.2 mols of ruthenium and 0.8 to 1.2 mols of iridium, then iron, nickel, or cobalt will be eluded excessively, making the catalyst low in durability.

In the above composition, the molar ratio of ruthenium should preferably be in the range from 1.8 to 2.2 for increasing an initial voltage efficiency without substantially reducing the durability.

The above catalyst may be used in a water electrolysis cell where a solid polymer electrolysis membrane is used as the electrolyte membrane.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
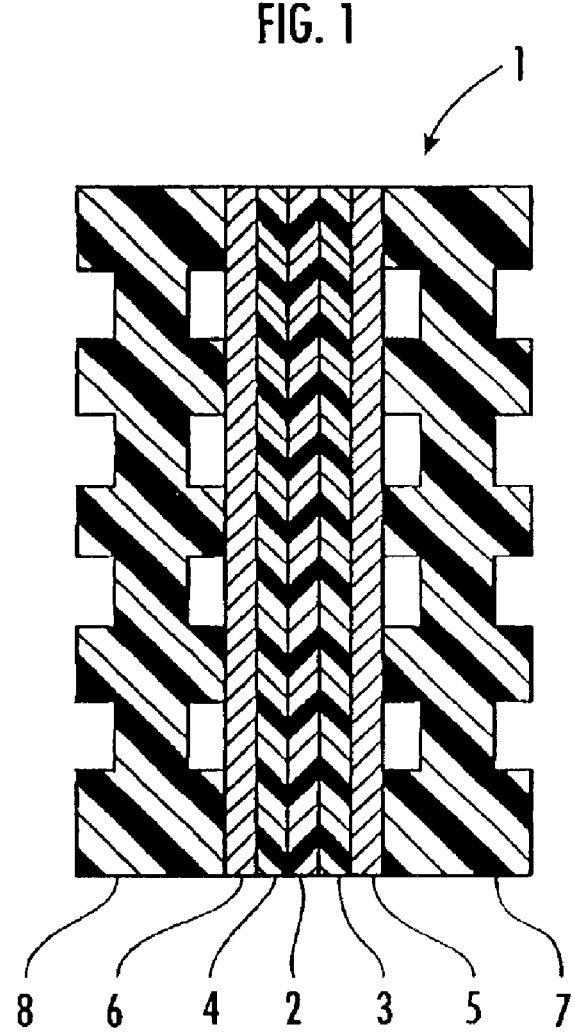
FIG. 1 is a cross-sectional view of a water electrolysis cell according to an embodiment of the present invention.

As shown in FIG. 1, a water electrolysis cell 1 according to an embodiment of the present invention comprises a solid polymer electrolyte membrane 2 sandwiched between a pair of catalytic layers 3, 4 and a pair of porous current distributors 5, 6 mounted respectively on the catalytic layers 3, 4. The water electrolysis cell 1 also has a pair of separators 7, 8 mounted respectively on the current distributors 5, 6 and having respective air/gas passages. Although not shown in FIG. 1, a plurality of water electrolysis cells 1 are arrayed with their separators 7, 8 interposed therebetween.

The solid polymer electrolyte membrane 2 comprises a cation ion exchange membrane, for example. Each of the catalytic layers 3, 4 is produced by preparing an electrolytic solution of an electrolyte made of the same components as the solid polymer electrolyte membrane 2, dispersing a given amount of catalyst powder in the electrolytic solution to produce a paste, and applying the paste to a sheet of polytetrafluoroethylene according to a screen printing process. The solid polymer electrolyte membrane 2 is sandwiched between the catalytic layers 3, 4 on those sheets of polytetrafluoroethylene. The assembly is hot-pressed, transferring the catalytic layers 3, 4 to the solid polymer electrolyte membrane 2. In this manner, the catalytic layers 3, 4 are joined to the solid polymer electrolyte membrane 2. The catalytic layers 3, 4 function as anode and cathode catalysts, respectively.

Each of the porous current distributors 5, 6 may comprise a porous titanium body plated with platinum. Each of the separators 7, 8 may comprise a body of titanium or stainless steel which is plated with platinum.

The catalytic layer 3, i.e., the anode catalyst, is made of an alloy containing ruthenium (Ru), iridium (Ir), and at least one metal selected from the group consisting of iron (Fe), nickel (Ni), and cobalt (Co). The catalytic layer 4, i.e., the cathode catalyst, is made of platinum (Pt). Alloys that can be used as the anode catalyst include Ru—Ir—Fe, Ru—Ir—Ni, and Ru—Ir—Co, for example.

Oxygen overvoltages provided by the alloys and whether the alloys are eluted when voltages are applied thereto will be described below.

Figure 2:
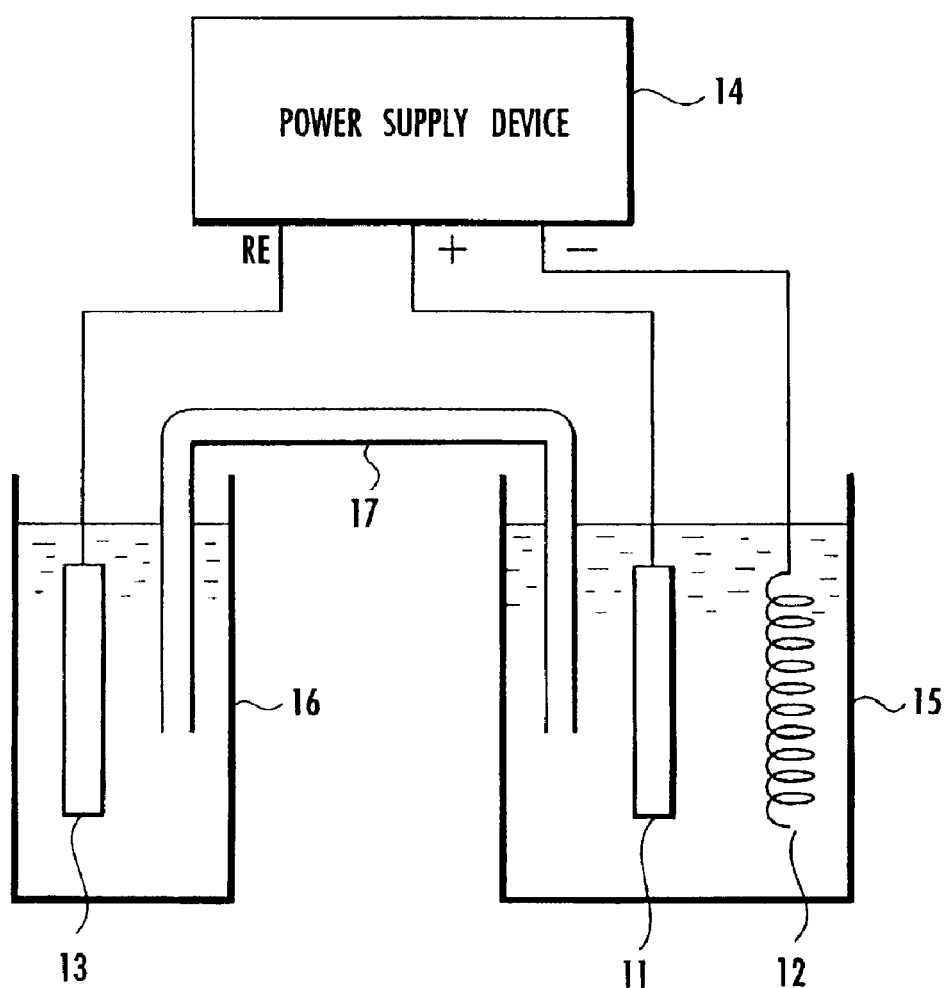
FIG. 2 is a schematic view, partly in block form, of a system for evaluating the performance of metal alloy for use as a catalyst.

The oxygen overvoltages provided by the alloys are measured by a system shown in FIG. 2. As shown in FIG. 2, the system comprises a working electrode 11, a counter electrode 12, a reference electrode 13, and a power supply device 14 to which the electrodes 11, 12, 13 are connected. The working electrode 11 and the counter electrode 12 are immersed in an aqueous solution of sulfuric acid at a ratio of 1 mol/l which is contained in a container 15, making up a half cell. The reference electrode 13 is immersed in an aqueous solution of sulfuric acid at a ratio of 1 mol/l which is contained in a container 16. The aqueous solutions of sulfuric acid in the containers 15, 16 are connected to each other by a liquid passage 17. The counter electrode 12 comprises a wire of platinum coated with platinum black, and the reference electrode 13 comprises a saturated calomel electrode (SCE).

A specimen catalyst in the form of a disk plate is used as the working electrode 11. In operation, the power supply device 14 supplies a current between the working electrode 11 and the counter electrode 12, and the potential of the working electrode 11 with respect to the reference potential of the reference electrode 13 is measured to determine the oxygen overvoltage provided by the specimen catalyst.

Figure 3:
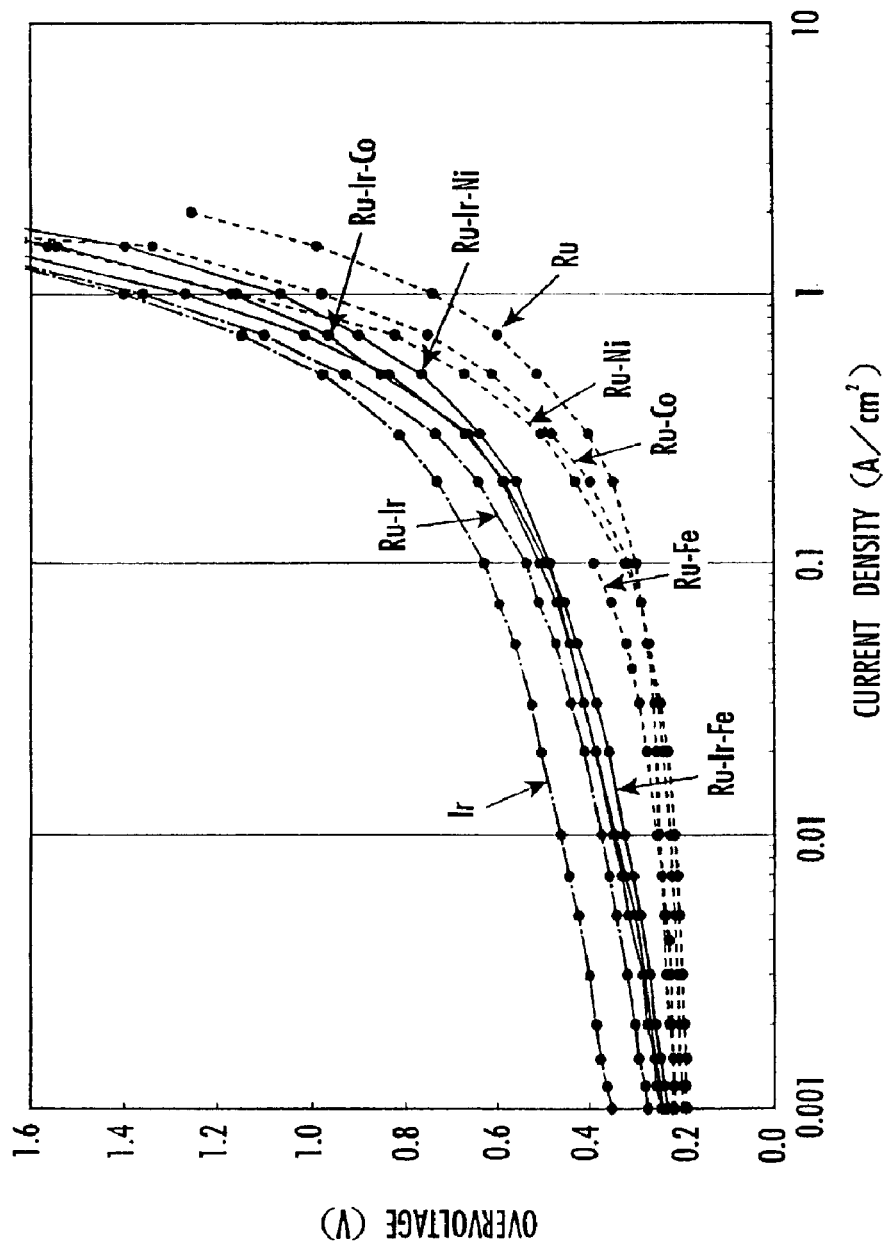
FIG. 3 is a diagram showing the relationship between the current density and oxygen overvoltage of metal alloy for use as a catalyst.

Using the system shown in FIG. 2, catalysts (Ru—Ir—Fe, Ru—Ir—Ni, and Ru—Ir—Co) for use as the catalytic layer 3 at the anode of the water electrolyte cell, conventional Ir-based catalysts (Ir, Ir—Ru), and conventional Ru-based catalysts (Ru, Ru—Fe, Ru—Ni, Ru—Co) were measured for oxygen overvoltages against current densities. The results are shown in FIG. 3. It can be seen from FIG. 3 that the alloys of Ru—Ir—Fe, Ru—Ir—Ni, and Ru—Ir—Co provide higher oxygen overvoltages than Ru, Ru—Fe, Ru—Ni, and Ru—Co, and lower oxygen overvoltages than Ir and Ir—Ru.

The metal materials shown in FIG. 3 were checked as to whether they are eluted under water electrolysis conditions or not. The results indicate that Ru, Ru—Fe, Ru—Ni, and Ru—Co were easily eluted, Ir, Ir—Ru, and Ru—Ir—Fe are not eluted, and Ru—Ir—Ni and Ru—Ir—Co were difficult to elute.

Therefore, the water electrolysis cell 1 which uses the alloys of Ru—Ir—Fe, Ru—Ir—Ni, and Ru—Ir—Co as the anode catalyst can electrolytes water at lower voltages than the Ir-based catalyst at the same current density. The alloys of Ru—Ir—Fe, Ru—Ir—Ni, and Ru—Ir—Co can be used over a long period of time as they are not eluded or are difficult to elude under water electrolysis conditions.

The above alloys can be of more excellent durability and can keep their capabilities over a longer period of time if at least one metal selected from the group consisting of Fe, Ni, and Co is in the range from 0.05 to 0.13 mol with respect to 0.8 to 2.2 mols of Ru and 0.8 to 1.2 mols of Ir.

The above alloys are capable of increasing the initial voltage efficiency without lowering the durability if the molar ratio of ruthenium is in the range from 1.8 to 2.2.

Inventive and Comparative Examples according to the present invention will be described below.

INVENTIVE EXAMPLE 1

Figure 4:
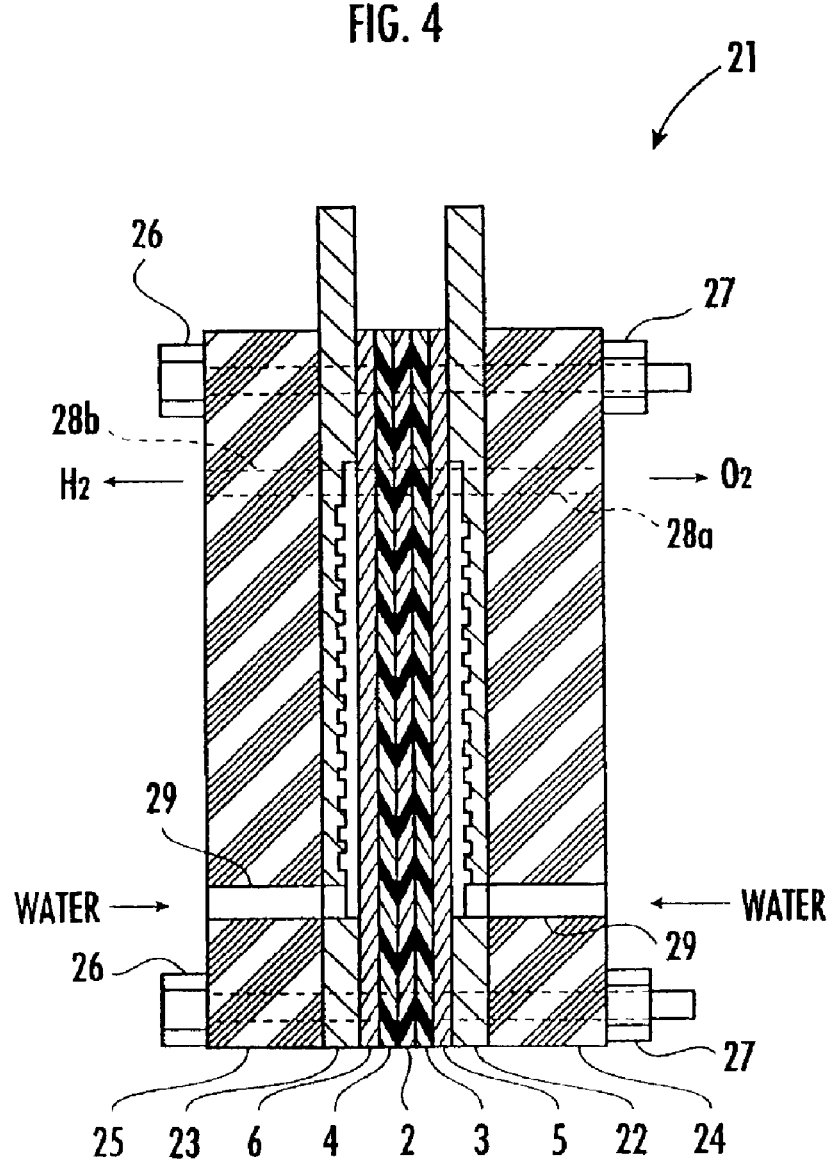
FIG. 4 is a is a cross-sectional view of a water electrolysis cell according to another embodiment of the present invention.

In Inventive Example 1, a water electrolysis cell 21 as a single cell shown in FIG. 4 was produced.

The water electrolysis cell 21 has a solid polymer electrolyte membrane (cation ion exchange membrane) 2, a pair of catalytic layers 3, 4, and a pair of porous current distributors 5, 6, which are identical to the solid polymer electrolyte membrane 2 of the water electrolysis cell 1 shown in FIG. 1, all sandwiched between a pair of electrode plates 22, 23 having respective gas/liquid passages. The electrode plates 22, 23 are supported by respective nonconductive supports 24, 25 held against respective outer surfaces thereof, and are fastened together by bolts 26 and nuts 27.

The water electrolysis cell 21 has an upper gas/liquid transport manifold 28 extending transversely through upper portions of the electrode plates 22, 23 and the supports 24, 25 and a lower gas/liquid transport manifold 29 extending transversely through lower portions of the electrode plates 22, 23 and the supports 24, 25. The upper gas/liquid transport manifold 28 comprises a manifold 28a extending through the catalytic layer 3, the porous current distributor 5, the electrode plate 22, and the support 24, and a manifold 28b extending through the catalytic layer 4, the porous current distributor 6, the electrode plate 23, and the support 25. If the catalytic layer 3 serves as an anode catalyst and the catalytic layer 4 as a cathode catalyst, then oxygen is extracted from the manifold 28a, and hydrogen is extracted from the manifold 28b. The catalytic layers 3, 4 and the porous current distributors 5, 6 are supplied with water through the lower gas/liquid transport manifold 29.

The solid polymer electrolyte membrane 2 comprises a cation ion exchange membrane having a thickness of 50 μm. The catalytic layer 3, i.e., the anode catalyst, is made of an oxide of Ru—Ir—Fe, and the catalytic layer 4, i.e., the cathode catalyst, is made of platinum black. Each of the porous current distributors 5, 6 comprises a porous titanium body plated with platinum, which has a thickness of 1.0 mm and a porosity of 60%. Each of the electrode plates 22, 23 comprises a titanium plate plated with platinum.

The water electrolysis cell 21 was fabricated as follows:

An aqueous solution of a metal salt containing ruthenium chloride ($RuCl_3$), hexachloroiridium acid ($H_2IrCl_6$), and iron chloride ($FeCl_3$) mixed at a molar ratio of 2:1:0.1 was prepared. Then, the metal salt was reduced and coprecipitated by an aqueous solution of tetrahydrosodium borate. The precipitated metal was filtered out as a catalyst precursor. The catalyst precursor was heated at 400° C. in the atmosphere, producing an oxide of Ru—Ir—Fe. The molar ratio of the oxide was Ru:Ir:Fe=2:1:0.1.

To the oxide of Ru—Ir—Fe, a solution (5 weight %) of an electrolyte having the same components as the cation ion exchange membrane used as the solid polymer electrolyte membrane 2 and a suitable amount of pure water were added, producing a paste. The paste was then applied to a blank sheet of polytetrafluoroethylene according to a screen printing process, producing an anode catalytic layer (e.g., the catalytic layer 3).

A cathode catalytic layer (e.g., the catalytic layer 4) was produced in the same manner as the anode catalytic layer 3, except that the catalyst was made of platinum black.

The blank sheets with the catalytic layers 3, 4 applied thereto were pressed against the solid polymer electrolyte membrane 2 by a hot-press method at a temperature of 125° C. under a pressure ranging from 10 to 12 MPa for 120 seconds. The catalytic layers 3, 4 were transferred to the solid polymer electrolyte membrane 2, thus producing a membrane electrode assembly. The catalytic layers 3, 4 joined to the solid polymer electrolyte membrane 2 eventually carried an amount of catalyst ranging from 1.5 to 3.0 mg/cm$^2$.

Then, the porous current distributors 5, 6, each comprising a porous titanium body plated with platinum, were mounted respectively on the catalytic layers 3, 4 joined to the solid polymer electrolyte membrane 2. The solid polymer electrolyte membrane 2, the catalytic layers 3, 4, and the porous current distributors 5, 6 were sandwiched between the electrode plates 22, 23, each comprising a titanium plate plated with platinum, thus making up the water electrolysis cell 21.

Water was then electrolyzed by the water electrolysis cell 21, and electrolysis voltages with respect to current densities were measured. The electrolysis was carried out while water was supplied to the catalytic layers 3, 4 at a rate of 10 ml/minute. The results are shown in Table 1 given below.

COMPARATIVE EXAMPLE 1

Water was electrolyzed in the same manner as with Inventive Example 1 except that the anode catalyst of the water electrolysis cell was made of iridium oxide. Electrolysis voltages with respect to current densities were measured. The results are also shown in Table 1.

TABLE 1

|  | | Electrolysis voltage (V) | |
|---|---|---|---|
|  | | Inventive Example | Comparative Example |
| Current density (A/cm$^2$) | 0.5 | 1.72 | 1.80 |
|  | 1.0 | 1.78 | 1.85 |

It can be understood from Table 1 that the water electrolysis cell having the oxide of Ru—Ir—Fe as the anode catalyst can electrolyze water at a lower voltage than the water electrolysis cell having the iridium oxide as the anode catalyst as with Comparative Example 1.

INVENTIVE EXAMPLE 2

Figure 5:
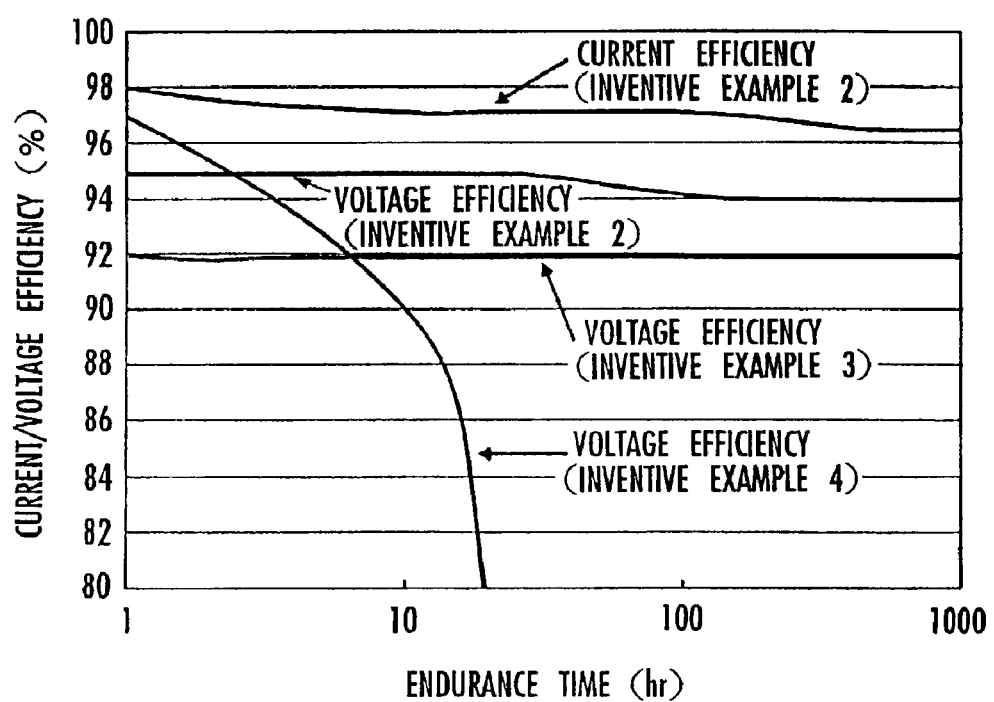
FIG. 5 is a graph showing the current and voltage efficiencies, as they vary with time, of catalysts for use in the anode of a water electrolysis cell according to the present invention.

The same water electrolysis cell 21 as the water electrolysis cell 21 according to Inventive Example 1 except that a cation ion exchange membrane having a thickness of 100 μm was used as the solid polymer electrolyte membrane 2 was prepared. Water is electrolyzed by the water electrolysis cell 21 at a current density of 1.4 A/cm$^2$ at a water temperature of 80° C., and changes with time of the current efficiency and the voltage efficiency with respect to the initial current and voltage were measured. The results are shown in FIG. 5.

INVENTIVE EXAMPLE 3

The same water electrolysis cell 21 as the water electrolysis cell 21 according to Inventive Example 1 except that a cation ion exchange membrane having a thickness of 100 μm was used as the solid polymer electrolyte membrane 2 and the anode catalyst was made of an oxide of an Ru—Ir—Fe alloy having a molar ratio Ru:Ir:Fe=1:1:0.1 was prepared. Water is electrolyzed by the water electrolysis cell 21 under the same conditions as with Inventive Example 2, and changes with time of the voltage efficiency with respect to the initial voltage were measured. The results are shown in FIG. 5.

INVENTIVE EXAMPLE 4

The same water electrolysis cell 21 as the water electrolysis cell 21 according to Inventive Example 1 except that a cation ion exchange membrane having a thickness of 100 μm was used as the solid polymer electrolyte membrane 2 and the anode catalyst was made of an oxide of an Ru—Ir—Fe alloy having a molar ratio Ru:Ir:Fe=2:1:1 was prepared. Water is electrolyzed by the water electrolysis cell 21 under the same conditions as with Inventive Example 2, and changes with time of the voltage efficiency with respect to the initial voltage were measured. The results are shown in FIG. 5.

A review of FIG. 5 clearly shows that the catalysts according to Inventive Examples 2 through 4, made of an oxide of the alloy of Ru—Ir—Fe, have the same time-dependent changes of the current efficiency, but the time-dependent changes of the voltage efficiency of the catalysts according to Inventive Examples 2, 3 where Fe is in the range from 0.05 to 0.13 mol with respect to 0.8 to 2.2 mols of Ru and 0.8 to 1.2 mols of Ir are smaller than the time-dependent changes of the voltage efficiency of the catalyst according to Inventive Example 4 where Fe is in excess of 0.13 mol with respect to 0.8 to 2.2 mols of Ru and 0.8 to 1.2 mols of Ir.

Therefore, the catalysts according to Inventive Examples 2, 3 where Fe is in the range from 0.05 to 0.13 mol with respect to 0.8 to 2.2 mols of Ru and 0.8 to 1.2 mols of Ir are capable of keeping their capabilities over a longer period of time at the time of electrolyzing water and have a better durability.

The catalyst according to Inventive Example 2 where Ru has a molar ratio of 2 in the range from 1.8 to 2.2 in the composition having 0.05 to 0.13 mol of Fe with respect to 0.8 to 2.2 mols of Ru and 0.8 to 1.2 mols of Ir has slightly greater time-dependent changes of the voltage efficiency, but a better initial voltage efficiency, than the catalyst according to the Inventive Example 3 where the molar ratio of Ru is 1.

In the above Inventive Examples, an oxide of Ru—Ir—Fe is used as the anode catalyst. However, an oxide of Ru—Ir—Ni or Ru—Ir—Co or an alloy of Ru—Ir—Fe, Ru—Ir—Ni, or Ru—Ir—Co may be used as the anode catalyst for the same effect. The oxide of Ru—Ir—Ni or Ru—Ir—Co may be fabricated by using nickel chloride or cobalt chloride, for example, instead of iron chloride in the process of fabricating the oxide of Ru—Ir—Fe according to Inventive Example 1.

A mixture of the alloy of Ru—Ir—Fe, Ru—Ir—Ni, or Ru—Ir—Co and its oxide may be used as the cathode catalyst to achieve the same effects as with the above Inventive Examples.

Although certain preferred embodiments of the present invention have been shown and described in detail, it should be understood that various changes and modifications may be made therein without departing from the scope of the appended claims.

What is claimed is:

1. A water electrolysis cell comprising:
   a pair of catalytic layers; and
   an electrolyte membrane sandwiched between said catalytic layers;
   said catalytic layers including an anode catalytic layer which contains a catalyst consisting of an alloy of ruthenium, iridium, and at least one metal selected from the group consisting of iron, nickel, and cobalt.

2. A water electrolysis cell according to claim 1, wherein said electrolyte membrane comprises a solid polymer electrolyte membrane.

3. A water electrolysis cell comprising:
   a pair of catalytic layers; and
   an electrolyte membrane sandwiched between said catalytic layers;
   said catalytic layers including an anode catalytic layer which contains a catalyst comprising an alloy of ruthenium, iridium, and at least one metal selected from the group consisting of iron, nickel, and cobalt;
   wherein said at least one metal has a molar ratio with respect to ruthenium and iridium in the range from 0.05 to 0.13 mol with respect to 0.8 to 2.2 mols of ruthenium and 0.8 to 1.2 mols of iridium.

4. A water electrolysis cell according to claim 3, wherein said at least one metal has a molar ratio with respect to ruthenium and iridium in the range from 0.05 to 0.13 mol with respect to 1.8 to 2.2 mols of ruthenium and 0.8 to 1.2 mols of iridium.

5. A water electrolysis cell comprising:
   a pair of catalytic layers; and
   an electrolyte membrane sandwiched between said catalytic layers;
   said catalytic layers including an anode catalytic layer which contains a catalyst comprising an oxide of an alloy of ruthenium, iridium, and at least one metal selected from the group consisting of iron, nickel, and cobalt.

6. A water electrolysis cell according to claim 5, wherein said electrolyte membrane comprises a solid polymer electrolyte membrane.

7. A water electrolysis cell, comprising:
   a pair of catalytic layers; and
   an electrolyte membrane sandwiched between said catalytic layers;
   said catalytic layers including an anode catalytic layer which contains a catalyst comprising an oxide of an alloy of ruthenium, iridium, and at least one metal selected from the group consisting of iron, nickel, and cobalt;
   wherein said at least one metal has a molar ratio with respect to ruthenium and iridium in the range from 0.05 to 0.13 mol with respect to 0.8 to 2.2 mols of ruthenium and 0.8 to 1.2 mols of iridium.

8. A water electrolysis cell according to claim 7, wherein said at least one metal has a molar ratio with respect to ruthenium and iridium in the range from 0.05 to 0.13 mol with respect to 1.8 to 2.2 mols of ruthenium and 0.8 to 1.2 mols of iridium.

9. A water electrolysis cell comprising:
   a pair of catalytic layers; and
   an electrolyte membrane sandwiched between said catalytic layers;
   said catalytic layers including an anode catalytic layer which contains a catalyst comprising a mixture of an alloy of ruthenium, iridium, and at least one metal selected from the group consisting of iron, nickel, and cobalt, and an oxide of said alloy.

10. A water electrolysis cell according to claim 9, wherein said at least one metal has a molar ratio with respect to ruthenium and iridium in the range from 0.05 to 0.13 mol with respect to 0.8 to 2.2 mols of ruthenium and 0.8 to 1.2 mols of iridium.

11. A water electrolysis cell according to claim 10, wherein said at least one metal has a molar ratio with respect to ruthenium and iridium in the range from 0.05 to 0.13 mol with respect to 1.8 to 2.2 mols of ruthenium and 0.8 to 1.2 mols of iridium.

12. A water electrolysis cell according to claim 9, wherein said electrolyte membrane comprises a solid polymer electrolyte membrane.

* * * * *